(12) United States Patent
Watson et al.

(10) Patent No.: US 7,159,616 B2
(45) Date of Patent: Jan. 9, 2007

(54) DUAL PATH HYDRAULIC COUPLING

(75) Inventors: Richard R. Watson, Missouri City, TX (US); Robert E. Smith, III, Missouri City, TX (US)

(73) Assignee: National Coupling Company, Inc., Stafford, TX (US)

( * ) Notice: Subject to any disclaimer, the term of this patent is extended or adjusted under 35 U.S.C. 154(b) by 0 days.

(21) Appl. No.: 11/273,217

(22) Filed: Nov. 14, 2005

(65) Prior Publication Data

US 2006/0102238 A1 May 18, 2006

Related U.S. Application Data

(60) Provisional application No. 60/628,567, filed on Nov. 17, 2004.

(51) Int. Cl.
*F16L 29/04* (2006.01)

(52) U.S. Cl. ............ 137/613; 137/614.04; 137/614.05; 137/628; 251/149.6

(58) Field of Classification Search .............. 137/613, 137/614.03, 614.04, 614.05, 627.5, 628; 251/149.6, 149.1
See application file for complete search history.

(56) References Cited

U.S. PATENT DOCUMENTS

| | | | | |
|---|---|---|---|---|
| 2,670,751 | A | * | 3/1954 | Wilson ........................ 137/107 |
| 3,211,178 | A | * | 10/1965 | Kiszko ................... 137/614.04 |
| 3,213,884 | A | * | 10/1965 | Moyer et al. ........... 137/614.03 |
| 4,249,572 | A | * | 2/1981 | Shindelar et al. ...... 137/614.04 |
| 4,971,107 | A | * | 11/1990 | Yonezawa ............... 137/614.03 |
| 5,469,887 | A | | 11/1995 | Smith, III |
| 6,202,690 | B1 | | 3/2001 | Smith, III |
| 6,202,691 | B1 | | 3/2001 | Smith, III |
| 6,237,632 | B1 | | 5/2001 | Smith, III |
| 6,474,359 | B1 | | 11/2002 | Smith, III |
| 6,511,043 | B1 | | 1/2003 | Smith, III |
| 6,516,831 | B1 | | 2/2003 | Smith, III |
| 6,575,430 | B1 | | 6/2003 | Smith, III |
| 6,626,207 | B1 | | 9/2003 | Smith, III |
| 6,659,425 | B1 | | 12/2003 | Smith, III |
| 6,663,144 | B1 | | 12/2003 | Smith, III |

FOREIGN PATENT DOCUMENTS

| | | |
|---|---|---|
| CA | 1109099 | 9/1981 |
| GB | 2 081 830 | 2/1982 |
| WO | WO 99/49247 | 9/1999 |

OTHER PUBLICATIONS

Combined Search and Examination Report received in co-pending European Patent Application No. GB0523353.1 dated Feb. 9, 2006.

* cited by examiner

*Primary Examiner*—Kevin Lee
(74) *Attorney, Agent, or Firm*—Wong, Cabello, Lutsch, Rutherford, & Brucculeri, LLP

(57) ABSTRACT

A female hydraulic coupling member is disclosed which comprises a first flow port; a second flow port; a third flow port in fluid communication with both the first flow port and the second flow port; a first poppet valve for opening and closing the first flow port; and a second poppet valve for opening and closing the second flow port, the second poppet valve being connected to the first poppet valve such that the second poppet valve moves to the closed position when the first poppet valve is open and moves to the open position when the first poppet valve is closed.

19 Claims, 3 Drawing Sheets

DUAL PATH HYDRAULIC COUPLING

CROSS-REFERENCE TO RELATED APPLICATIONS

This application claims the benefit of U.S. Provisional Application No. 60/628,567 filed Nov. 17, 2004, and entitled "Dual Path Hydraulic Coupling."

BACKGROUND OF THE INVENTION

1. Field of the Invention

This invention relates to fluid couplings. More particularly, it relates to hydraulic couplings used in undersea equipment for oil and gas exploration and production.

2. Description of the Related Art

Many varieties and configurations of hydraulic couplings are known in the art. Examples of various undersea hydraulic coupling members are disclosed in the following United States patents by Robert E. Smith III: U.S. Pat. No. 6,663,144 entitled Seal retainer for undersea hydraulic coupling; U.S. Pat. No. 6,659,425 entitled Male coupling member with improved flow ports; U.S. Pat. No. 6,626,207 entitled Undersea hydraulic coupling with interlocking poppet valve actuators; U.S. Pat. No. 6,575,430 entitled Hydraulic coupling with dovetail seal having multiple radial sealing surfaces; U.S. Pat. No. 6,516,831 entitled Undersea hydraulic coupling with radial seals on probe; U.S. Pat. No. 6,511,043 entitled Female coupling member with recessed flow passages; U.S. Pat. No. 6,474,359 entitled Undersea hydraulic coupling member; U.S. Pat. No. 6,357,722 entitled Undersea hydraulic coupling with guide for valve actuator; U.S. Pat. No. 6,237,632 entitled Undersea hydraulic coupling member with primary and secondary poppet valves; U.S. Pat. No. 6,202,691 entitled Undersea hydraulic coupling with bleed port; U.S. Pat. No. 6,202,690 entitled Pressure balanced undersea hydraulic coupling; and, U.S. Pat. No. 5,469,887 entitled Hydraulic coupling with pressure equalizing valve.

In general, the hydraulic couplings of the prior art have a single inlet and a single outlet for the hydraulic fluid. If multiple flow paths are needed, two or more couplings of the prior art must be used in combination, or, in the alternative, an arrangement of valves may be employed to create multiple flow paths for the fluid. The present invention solves this problem by providing a single coupling having multiple flow paths. One example of an application for a coupling having multiple flow paths is the installation of an hydraulically-powered or hydraulically-controlled device which requires one hydraulic fluid path to be maintained during the installation process and another hydraulic fluid path once it is installed.

SUMMARY OF THE INVENTION

In one preferred embodiment, the present invention comprises a female hydraulic coupling having three ports. The first port is in fluid communication with the receiving chamber of a conventional female hydraulic coupling member. In use, the male probe of a corresponding coupling is seated within the receiving chamber thereby establishing fluid communication between the male member and the first port of the female member.

The female member has two additional ports. The second such port is in fluid communication with the third port when the female member is not engaged with a corresponding male coupling member. However, when the probe of a corresponding male coupling is seated in the receiving chamber of the female coupling, fluid flow to or from the second port is blocked and a fluid path between the first and third flow ports is established.

DETAILED DESCRIPTION OF THE INVENTION

The female coupling allows fluid flow in two directions depending on the position of the two poppet valves. This has the advantage of saving space compared to using two separate couplings or a complex arrangement of valves. This design improves reliability which is of very high importance in high-temperature, high-pressure undersea applications.

Figure 1:
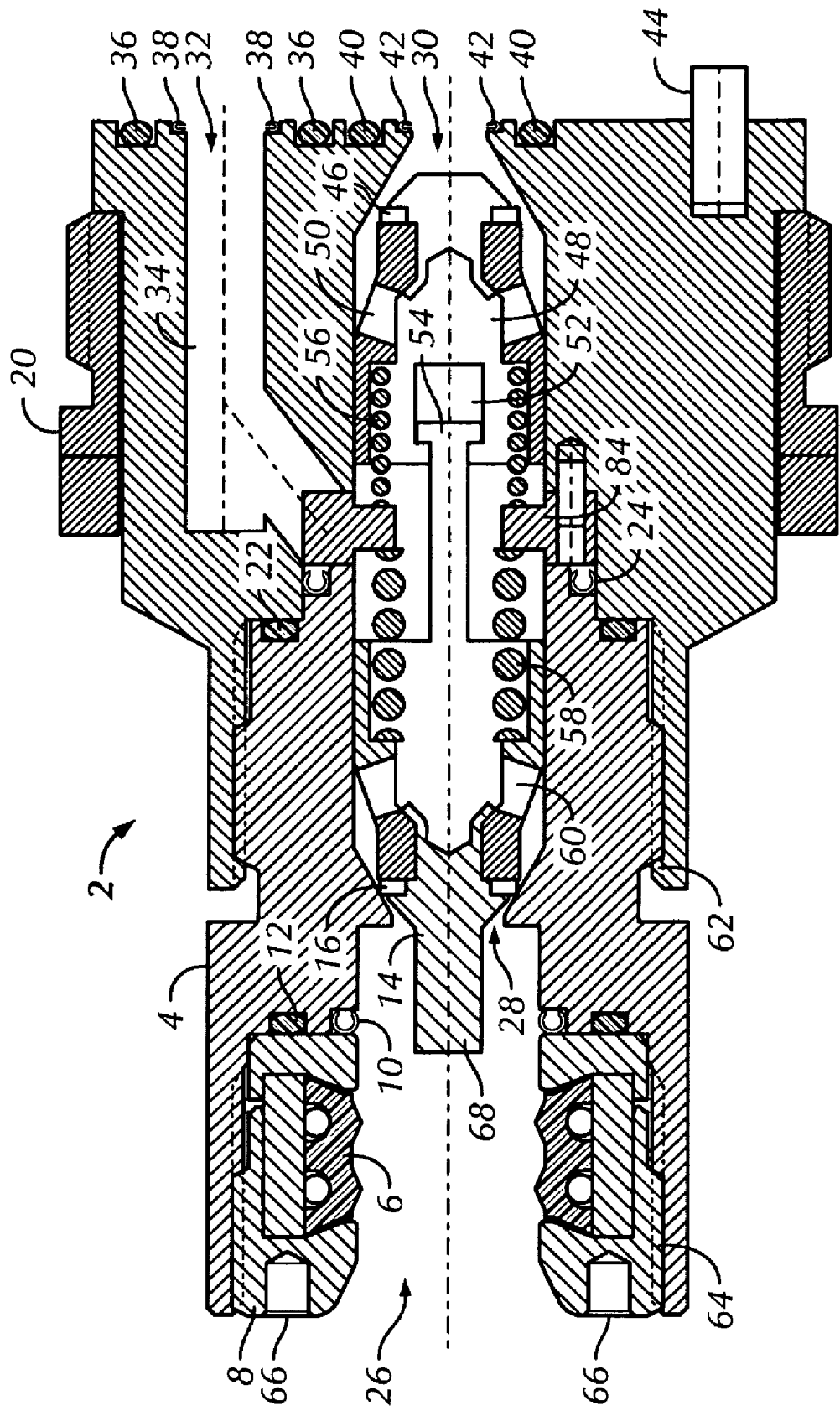
FIG. 1 is a cross-sectional view of a disengaged female hydraulic coupling according to the present invention.

FIG. 1 shows a coupling of the invention with the first poppet valve 14 closed because no male coupling is mated which would open the first poppet valve 14 and close the second poppet 48. In this positioning of the poppets, flow is allowed through the second flow port 30 and 3rd flow port 32. Flow between the second flow port 30 and 3rd flow port 32 can be in either direction. The poppet interlock 54 between the first poppet 14 and the second poppet 48 holds the second poppet 48 open when the first poppet 14 is closed. first spring 58 closes first poppet 14 and opens second poppet 48 when the male coupling 70 is de-mated. second and 3rd flow ports (30 and 32, respectively) are out the bottom of the coupling 2 and can be sealed to mounting side opposite the coupling bottom. Seals (36, 38, 40 and 42) on these ports can be of elastomer, metal or any combination thereof, but not limited to these. The coupling can be held to its mounting by a nut 20 or other retaining devices.

Figure 2:
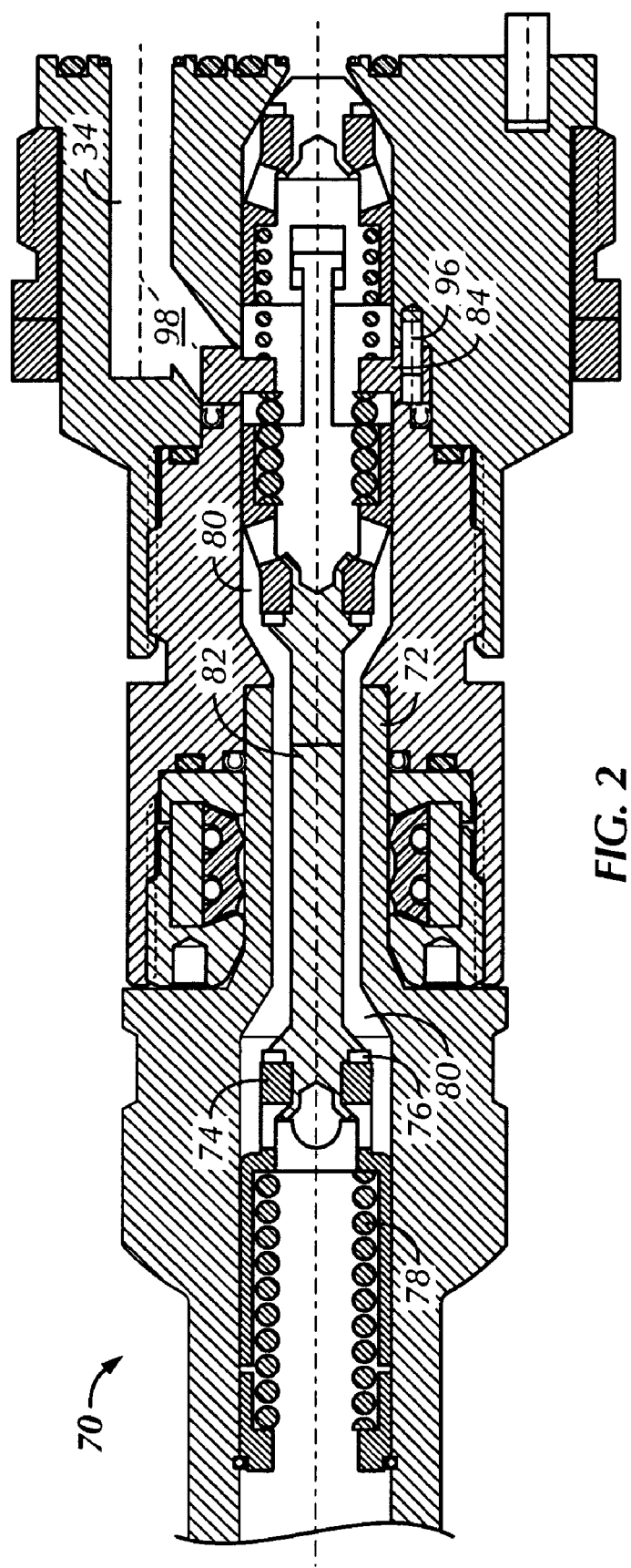
FIG. 2 is a cross-sectional view of the female hydraulic coupling member of FIG. 1 shown in engagement with a corresponding male hydraulic coupling member.

FIG. 2 shows a male coupling 70 fully mated with the pass thru female coupling 2. The male poppet pushes the first poppet 14 of the female coupling open which allows the second spring 56 to close the second poppet 48. Flow is now blocked out the second flow port 30. Flow is between the first flow port 28 and the 3rd flow port 32. Flow can be either direction. The second poppet 48 is also held closed by the internal pressure of flow through the first and 3rd flow ports.

Referring now to FIG. 1, female coupling member 2 is shown in cross section and is comprised of female body top portion 4 and bottom portion 18. In the illustrated embodiment, threaded portion 62 is provided for engaging top portion 4 to bottom portion 18. Other engagement means may be used. Fluid-tight engagement of top portion 4 to bottom portion 18 may be provided by metal, pressure-energized C-seal 24 and/or elastomeric seal 22.

Female coupling member 2 includes receiving chamber 26 with crown seal 6 secured by seal retainer 8 which has threaded portion 64 for engaging body top portion 4. Spanner engagement holes 66 may be provided in seal retainer 8 for imparting torque to seal retainer 8 by means of a spanner wrench. Pressure-energized metal C-seal 10 may be provided to seal against the seal retainer 8, body 4 and the probe of a male coupling member inserted in receiving chamber 26 (as shown in FIG. 2). Secondary elastomeric seal 12 may be provided to create an additional fluid-tight seal between seal retainer 8 and body 4. It will be appreciated by those skilled in the art that may different seal configurations, seal retainers, bore liners and the like may be employed in receiving chamber 26. Such configurations are disclosed in detail in the patents cited in the Background section hereof. The disclosures of these patents are hereby incorporated by reference in their entireties.

Constrained within female coupling 2 is first poppet 14 which comprises poppet seal 16 for sealing first port 28 by contacting the interior bore of body top portion 4. First poppet 14 is shown in the closed position in FIG. 1 and in the open position in FIG. 2.

First poppet 14 comprises poppet flow ports 60, actuator spring 58 and poppet actuator 68. When first poppet 14 is in the open position, fluid communication is established between first port 28 and 3rd port 32 via poppet flow ports 60 and flow passageway 34.

In the illustrated embodiment, female body bottom part 18 is designed for fluid and mechanical engagement with a flange (not shown). The flange may be provided with threaded wells for engaging retainer nut or gland nut 20. Such wells may be in a manifold and/or in the flange of a tubing hanger or tree used in a subsea oil well. The bottom surface of the well may have fluid passageways or ports which align with second flow port 30 and 3rd flow port 32. A fluid-tight seal between second port 30 and a corresponding port in the receiving well may be made by primary pressure-energized metal C-seal 42 and secondary elastomeric seal 40 which may be an O-ring. A fluid-tight seal between 3rd port 32 and a corresponding port in the receiving well may be made by primary pressure-energized metal C-seal 38 and secondary elastomeric seal 36 which may be an O-ring. Alignment of the ports in female bottom part 18 and those in the receiving well may be ensured by alignment pin 44 which engages a corresponding hole in the bottom surface of the receiving well. In a preferred embodiment, retainer nut 20 is able to seat body 18 into the receiving well such that there is no extrusion gap between the bottom face of body 18 (containing seals 36 and 40) and the opposing face of the receiving well.

Female coupling member 2 also includes second poppet 48 having poppet seal 46 and poppet flow ports 50 which are analogous to those of first poppet 14. Second poppet 48 is held in the closed position by poppet spring 56. Second poppet 48 is shown in the open position in FIG. 1 and in the closed position in FIG. 2.

First poppet 14 and second poppet 48 are interlocked by means of poppet interlock 54 which, in the illustrated embodiment, comprises an extension of first poppet 14 having a T-shaped cross section which slidably fits within poppet interlock receiver 52 in second poppet 48. First poppet spring 58 is selected to provided greater force than second poppet spring 56. Poppet springs 56 and 58 may bear against internal shoulder 84. Thus, in the absence of an engaged male member, first poppet spring 58 urges first poppet 14 to the closed position wherein first poppet seal 16 contacts the internal bore of body portion 4. In so doing, poppet interlock 54 moves second poppet 48 to the open position wherein second poppet seal 46 is withdrawn from contact with the internal bore of female body bottom part 18. As illustrated in FIG. 1, this configuration provides fluid communication between second flow port 30 and 3rd flow port 32 via poppet ports 48 and internal flow passage 34.

Alignment pin 96 may be provided to secure shoulder 84 in position such that a fluid passageway in shoulder 84 aligns with angled fluid passage 98 which is in fluid communication with flow passage 34.

FIG. 2 shows the female coupling of FIG. 1 in engagement with a corresponding male coupling member 70. Male coupling 70 comprises male probe 72 which is inserted into receiving chamber 26 of female coupling 2. Crown seal 6 and pressure-energized metal C-seal 10 radially seal to the outer circumference of probe 72.

Male coupling 70 also comprises poppet 74 which is a normally-closed valve because spring 78 urges male poppet seal 76 against the inner bore of male member 70 thereby providing a fluid-tight seal.

Male poppet 74 also comprises poppet actuator 82 which contacts poppet actuator 68 in female coupling 2. As is more fully described in the patents listed in the Background section hereof, poppet actuators 82 and 68 and poppet springs 78 and 58 are preferably sized such that when male probe 72 is fully seated within receiving chamber 26 of female coupling 2, both male poppet 72 and first poppet 14 within female coupling 2 are fully open and hydraulic fluid (or other fluids) may flow between male coupling 70 and female coupling 2 via fluid passageway 80.

As may also be seen in FIG. 2, when first poppet 14 is in the open position, poppet interlock 54 moves off the shoulder of poppet interlock receiver 52 thereby allowing second poppet spring 56 to move second poppet 48 to the closed position wherein seal 46 is in sealing engagement with the internal bore of body 18 and second flow port 30 is closed. Fluid pressure within the internal bore of body 18 may also act to urge second poppet 48 to its closed position.

When second poppet 48 is closed (as illustrated in FIG. 2 due to a male coupling being engaged), the fluid path is between first flow port 28 and 3rd flow port 32 within female coupling 2. The fluid flow may be in either direction. Thus, fluid flow from male coupling 70 through passageway 80 will be automatically directed to 3rd flow port 32 and fluid flow to or from second flow port 30 will be blocked.

Figure 3:
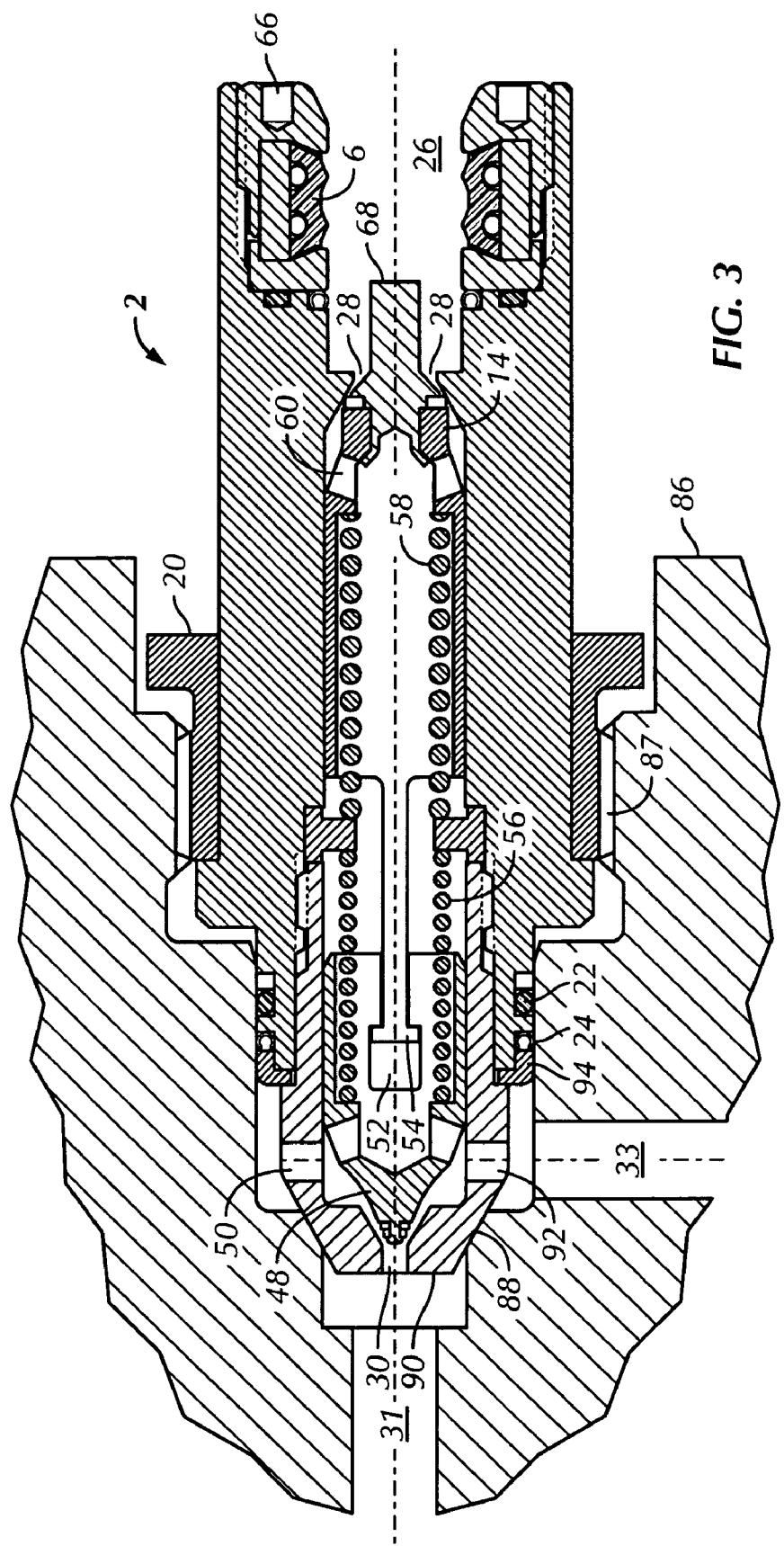
FIG. 3 is a cross-sectional view of a second embodiment a female coupling according to the invention.

FIG. 3 shows an embodiment of the invention wherein the second flow port 30 is orthogonal to the third flow port 32. This embodiment of the invention may be symmetric about its longitudinal axis and does not require an alignment device (such as alignment pin 44 of the embodiment shown in FIGS. 1 and 2) to orient it during installation in receptacle 86 which may include threaded portion 87 for engagement of retainer nut 20.

In the embodiment of FIG. 3, the body of female coupling 2 has tapered nose section 90 which may form a metal-to-metal seal with receptacle 86 at beveled shoulder 88. This metal-to-metal seal may provide a fluid-tight boundary between first fluid passageway 31 and third fluid passageway 33. In one application example, hydraulic fluid in passageway 33 enters female coupling 2 by way of radial flow passages 92. If first poppet valve 14 is closed (no male coupling member inserted into female coupling receiving chamber 26), second poppet valve 48 will be open and fluid will flow out of second flow port 30 and into first fluid passageway 31. If, however, a male coupling member is seated in receiving chamber 26, depressing female poppet actuator 68, first poppet valve 14 will be open, thereby permitting second poppet valve 48 to move to its closed position under the influence of second poppet spring 56. In this condition, fluid entering passage 33 will be directed through the body of female coupling 2 and out first port 28.

Metal C-seal 24 (held in position by retainer 94) and elastomeric O-ring seal 22 may be provided for sealing engagement of female coupling 2 with receptacle 86.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A female hydraulic coupling member comprising:
a first flow port;
a second flow port;
a third flow port in fluid communication with both the first flow port and the second flow port;
a first poppet valve for opening and closing the first flow port;
a second poppet valve for opening and closing the second flow port and having a first end and a second end, said second poppet valve connected to the first poppet valve such that the second poppet valve moves to the closed position when the first poppet valve is open and moves to the open position when the first poppet valve is closed, said second poppet valve having a central axial passageway open on the first end and in fluid communication with at least one poppet flow port proximate the second end.

2. An hydraulic coupling member as recited in claim 1 wherein the first poppet valve is biased to the closed position by a first spring and the second poppet valve is biased to the closed position by a second spring, the first spring being stronger than the second spring such that the extension force of the first spring is sufficient to compress the second spring.

3. An hydraulic coupling member as recited in claim 1 further comprising a sliding connector which connects the first poppet valve to the second poppet valve such the second poppet valve is moved to the open position when the first poppet valve moves to the closed position and the second poppet valve can move independently of the first poppet valve when the first poppet valve is in the open position.

4. An hydraulic coupling member as recited in claim 3 wherein the second poppet valve moves a smaller distance when moving from its open position to its closed position than the first poppet valve moves when moving from its closed position to its open position.

5. A female hydraulic coupling member comprising:
a first body having a central axial bore;
a second body having a central axial bore, a threaded portion for engaging the first body, a fluid passage offset from and substantially parallel to the central axial bore, a connecting passage in fluid communication with the central axial bore and the offset fluid passage, the axis of which forms an acute angle with the central axial bore;
a first poppet valve for opening and closing a first end of the central axial bore; and,
a second poppet valve for opening and closing a second end of the central axial bore, said second poppet valve connected to the first poppet valve such that the second poppet valve moves to the closed position when the first poppet valve is open and moves to the open position when the first poppet valve is closed.

6. An hydraulic coupling member as recited in claim 5 wherein the first poppet valve is biased to the closed position by a first spring and the second poppet valve is biased to the closed position by a second spring, the first spring being stronger than the second spring such that the extension force of the first spring is sufficient to compress the second spring.

7. An hydraulic coupling member as recited in claim 5 further comprising a sliding connector which connects the first poppet valve to the second poppet valve such the second poppet valve is moved to the open position when the first poppet valve moves to the closed position and the second poppet valve can move independently of the first poppet valve when the first poppet valve is in the open position.

8. An hydraulic coupling member as recited in claim 7 wherein the second poppet valve moves a smaller distance when moving from its open position to its closed position than the first poppet valve moves when moving from its closed position to its open position.

9. An hydraulic coupling member as recited in claim 5 further comprising a valve actuator on the first poppet valve for engaging a corresponding valve actuator on a male hydraulic coupling member adapted for mating with the female coupling member.

10. An hydraulic coupling member as recited in claim 5 wherein the second body has a first threaded end for engaging the first body and an opposing, substantially planar second end having a first port in fluid communication with the central bore and a second port in fluid communication with the offset fluid passage.

11. An hydraulic coupling member as recited in claim 10 further comprising a metal C-seal surrounding the first port.

12. An hydraulic coupling member as recited in claim 11 further comprising an elastomeric O-ring seal concentric with the metal C-seal for sealing to an opposing, substantially planar, bulkhead fitting.

13. An hydraulic coupling member as recited in claim 10 further comprising an alignment pin connected to and projecting from the second end of the second body.

14. An hydraulic coupling comprising:
a first fluid port;
a second fluid port;
a third fluid port;
a first valve connected to the first fluid port;
a second valve connected to the second fluid port said second valve having a central axial passage;
a valve interconnect linking the first valve to the second valve such that opening the first valve closes the second valve; and,
a fluid passage connecting the third fluid port to the first fluid port via the central axial passage of the second valve and to the second fluid port.

15. An hydraulic coupling as recited in claim 14 wherein the valve interconnect comprises:
a shaft having a first end connected to the first valve and a second end adapted for limited sliding engagement with the second valve;
a receiver within the second valve for receiving the second end of the shaft such that the second valve can move to the fully closed position when the first valve is open and is prevented from moving to the closed position when the first valve is in the closed position.

16. An hydraulic coupling as recited in claim 14 wherein the first valve comprises a spring that biases the valve to the closed position.

17. An hydraulic coupling as recited in claim 16 wherein the second valve comprises a spring that biases the second valve to the closed position which spring has less force than the spring comprising the first valve.

18. An hydraulic coupling as recited in claim 15 wherein the receiver comprises a first shoulder and the second end of the shaft comprises a second shoulder such that the second shoulder.

19. An hydraulic coupling as recited in claim 15 wherein the first valve and the second valve comprise poppet valves.

* * * * *